US011304147B2

(12) United States Patent
Yang et al.

(10) Patent No.: US 11,304,147 B2
(45) Date of Patent: Apr. 12, 2022

(54) ELECTRONIC DEVICE SUPPORTING 5G NETWORK COMMUNICATION AND METHOD FOR ELECTRONIC DEVICE TO CONTROL TRANSMIT POWER

(71) Applicant: Samsung Electronics Co., Ltd., Suwon-si (KR)

(72) Inventors: Sukjae Yang, Suwon-si (KR); Yungyu Bae, Suwon-si (KR); Jaeho Song, Suwon-si (KR); Jungmin Yoon, Suwon-si (KR); Seongji Cho, Suwon-si (KR); Heejun Kwon, Suwon-si (KR); Minseok Kim, Suwon-si (KR); Kyungrok Lee, Suwon-si (KR); Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/785,886

(22) Filed: Feb. 10, 2020

(65) Prior Publication Data

US 2020/0275383 A1 Aug. 27, 2020

(30) Foreign Application Priority Data

Feb. 26, 2019 (KR) .................. 10-2019-0022342

(51) Int. Cl.
*H04W 52/18* (2009.01)
*H04W 76/27* (2018.01)
*H04W 84/12* (2009.01)

(52) U.S. Cl.
CPC ........... *H04W 52/18* (2013.01); *H04W 76/27* (2018.02); *H04W 84/12* (2013.01)

(58) Field of Classification Search
CPC ..... H04W 52/02; H04W 52/04; H04W 52/14; H04W 52/18; H04W 52/243;
(Continued)

(56) References Cited

U.S. PATENT DOCUMENTS 9,992,742 B2  6/2018  Zhang et al.
2007/0286111 A1  12/2007  Corson et al.
(Continued)

FOREIGN PATENT DOCUMENTS

EP        2779738 A1     9/2014
KR  10-2008-0096536 A   10/2008
(Continued)

OTHER PUBLICATIONS

European Search Report dated Jul. 10, 2020 in connection with European Patent Application No. 20 15 7704, 9 pages.
(Continued)

*Primary Examiner* — Md K Talukder

(57) ABSTRACT

An electronic device includes a Wi-Fi module configured to perform communication in a first frequency band, a communication module configured to wirelessly communicate with a given network in a second frequency band, a first processor operatively connected to the communication module, a second processor operatively connected to the Wi-Fi module and the first processor, and a memory operatively connected to the second processor. The memory may store instructions, that when executed by the second processor, cause the second processor to receive, from the first processor, a message notifying a state of the electronic device wirelessly communicating with the given network and to lower transmit power of the Wi-Fi module in response to the message.

16 Claims, 7 Drawing Sheets

(58) Field of Classification Search
CPC ..... H04W 52/36; H04W 52/42; H04W 72/04; H04W 72/08; H04W 72/1215; H04W 76/27; H04W 84/12; H04W 88/06
See application file for complete search history.

(56) References Cited

U.S. PATENT DOCUMENTS

| | | | |
|---|---|---|---|
| 2013/0208587 A1 | 8/2013 | Bala et al. | |
| 2014/0274179 A1 | 9/2014 | Zhu et al. | |
| 2015/0195844 A1* | 7/2015 | Yang | H04W 16/14 455/452.2 |
| 2016/0044652 A1 | 2/2016 | Xue et al. | |
| 2016/0157187 A1* | 6/2016 | Zhu | H04W 52/367 370/311 |
| 2017/0078983 A1* | 3/2017 | Ahn | H04W 52/34 |
| 2018/0014251 A1 | 1/2018 | Sambhwani et al. | |
| 2018/0288707 A1 | 10/2018 | Jeon et al. | |
| 2018/0352554 A1* | 12/2018 | Flynn | H04W 72/082 |
| 2019/0215765 A1* | 7/2019 | Ramasamy | H04W 52/367 |
| 2019/0246408 A1* | 8/2019 | Ngai | H04W 16/14 |
| 2020/0275383 A1* | 8/2020 | Yang | H04W 76/27 |
| 2020/0359333 A1* | 11/2020 | Chen | H04W 52/245 |

FOREIGN PATENT DOCUMENTS

| | | |
|---|---|---|
| KR | 10-2016-0036649 A | 4/2016 |
| WO | 2013/025026 A2 | 2/2013 |
| WO | 2015/174759 A1 | 11/2015 |

OTHER PUBLICATIONS

International Search Report dated Apr. 28, 2020 in connection with International Patent Application No. PCT/KR2020/001214, 4 pages.
Written Opinion of the International Searching Authority dated Apr. 28, 2020 in connection with International Patent Application No. PCT/KR2020/001214, 5 pages.

* cited by examiner

ELECTRONIC DEVICE SUPPORTING 5G NETWORK COMMUNICATION AND METHOD FOR ELECTRONIC DEVICE TO CONTROL TRANSMIT POWER

CROSS-REFERENCE TO RELATED APPLICATION

This application is based on and claims priority under 35 U.S.C. § 119 to Korean Patent Application No. 10-2019-0022342, filed on Feb. 26, 2019, in the Korean Intellectual Property Office, the disclosure of which is incorporated by reference herein in its entirety.

BACKGROUND

1. Field

The disclosure relates to an electronic device supporting 5G network communication and a method for the electronic device to control transmit power.

2. Description of Related Art

An electronic device may radiate an electromagnetic signal for wireless communication with an external device. The electromagnetic signal may be harmful to the human body, and thus several authorized institutes regulate numerical values of human body specific absorption rate (SAR) and maximum permissible exposure (MPE) of an electronic device. The SAR is a standard of a frequency band of 6 GHz or less, and the MPE is a standard of a frequency band of 6 GHz or more. The regulation further includes a regulation on which the sum normalized as regulated numerical values of the SAR and MPE of each communication standard (e.g., LTE, NR or WIFI) on which electronic devices may perform communication at the same time is a given value or less.

An electronic device may control the numerical values of the SAR and MPE so that they do not exceed the numerical values of a regulated electromagnetic-related regulation by reducing transmit power based on a frequency band of wireless communication.

SUMMARY

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive (MIMO), full dimensional MIMO (FD-MIMO), array antenna, analog beam-forming and large scale antenna technologies are being discussed in the 5G communication system.

However, a 5G communication system may have a problem in that it is difficult to satisfy the regulation of numerical values of the SAR and MPE, which have been regulated using a method of reducing transmit power based on a frequency band of conventional wireless communication, because the 5G communication system is implemented in a mmWave band (e.g., a band of 20 GHz or more).

Various embodiments of the disclosure may provide an electronic device capable of providing an optimal 5G network communication environment while reducing the numerical values of the SAR and MPE, and a method for the electronic device to control transmit power.

An electronic device includes a Wi-Fi module configured to perform communication in a first frequency band, a communication module configured to wirelessly communicate with a given network in a second frequency band, a first processor operatively connected to the communication module, a second processor operatively connected to the Wi-Fi module and the first processor, and a memory operatively connected to the second processor. The memory may store instructions, upon execution, enabling the second processor to receive, from the first processor, a message notifying a state of the electronic device wirelessly communicating with the given network and to lower transmit power of the Wi-Fi module in response to the message.

A method for an electronic device to control transmit power, the method may include identifying whether a state of the electronic device is a state in which the electronic device wirelessly communicates with a given network and lowering transmit power of a Wi-Fi module based on the state of the electronic device performing wireless communication with the given network.

An electronic device includes a Wi-Fi module configured to perform communication in a first frequency band, a communication module configured to wirelessly communicate with a given network in a second frequency band, a first processor operatively connected to the communication module, a second processor operatively connected to the Wi-Fi module and the first processor, and a memory operatively connected to the second processor. The memory may store instructions, upon execution, enabling the second processor to receive, from the first processor, a message notifying a state of the electronic device wirelessly communicating with the given network and to lower transmit power of the communication module in response to the message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various example embodiments of the disclosure will be described in greater detail with reference to accompanying drawings.

Figure 1:
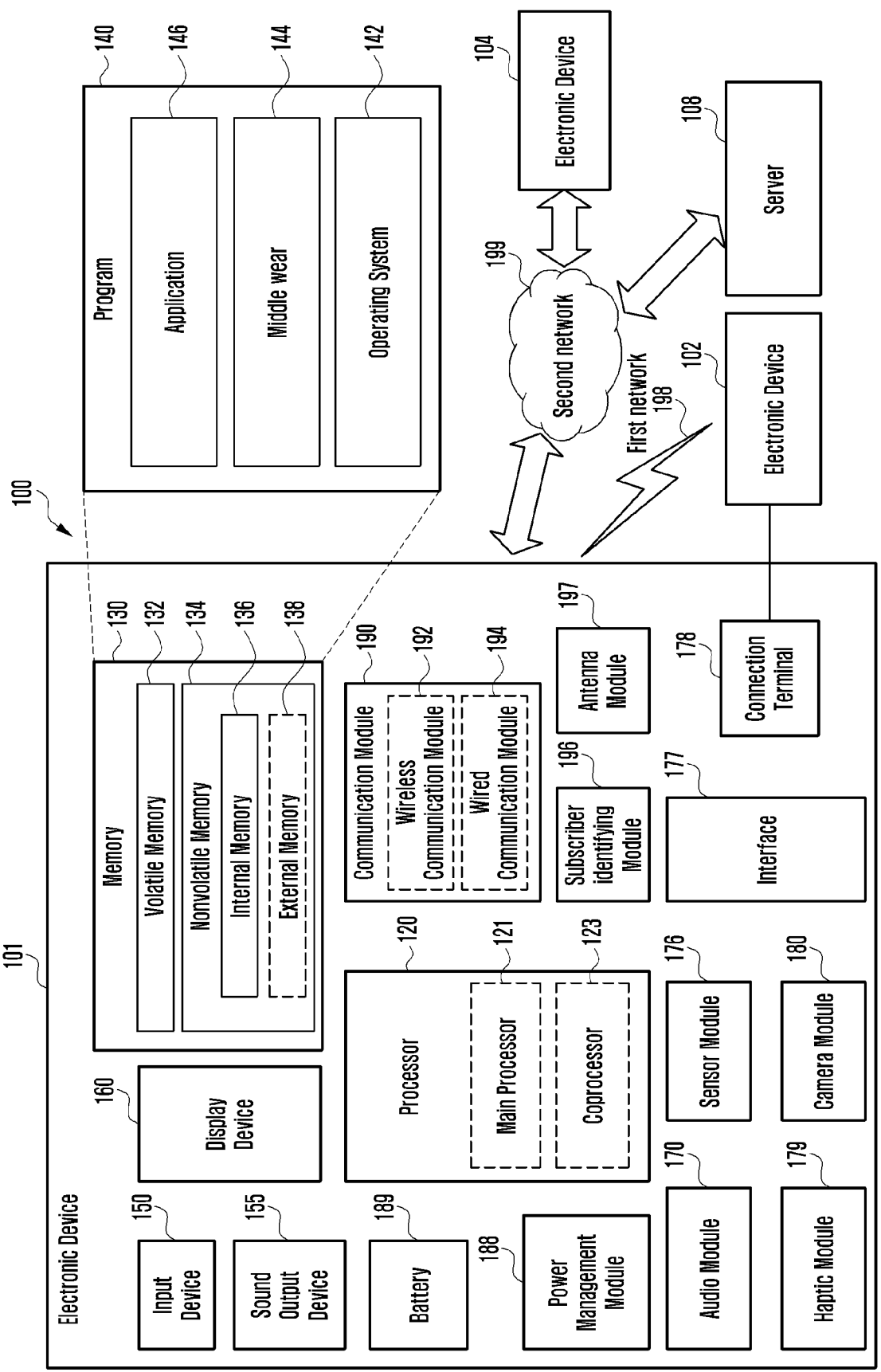
FIG. 1 illustrates a block diagram of an electronic device within a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 over a first network 198 (e.g., a short-range wireless communication network), or an electronic device 104 or a server 108 over a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., in a wired way) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., in a wired way) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
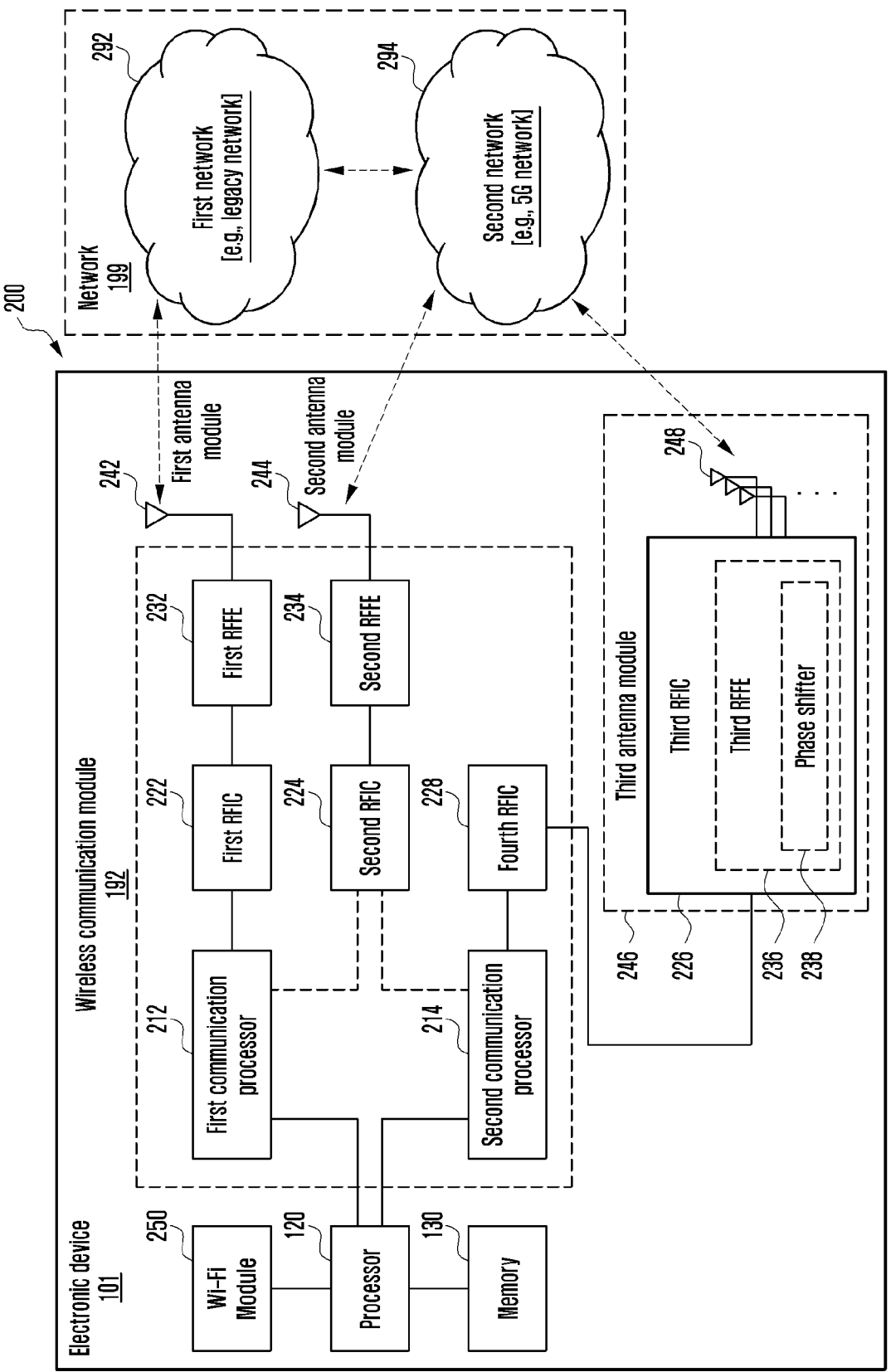
FIG. 2 illustrates a block diagram of an electronic device for supporting legacy network communication and 5G network communication according to various embodiments.

FIG. 2 illustrates a block diagram 200 of an electronic device 101 for supporting legacy network communication and 5G network communication according to various embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130.

The network 199 may include a first network 292 and a second network 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second communication processor 214 may support establishment of a communication channel corresponding to a designated band (e.g., about 6 GHz to about 60 GHz) among bands to be used for wireless communication with the second network 294, and 5G network communication through the established communication channel. According to various embodiments, the second network 294 may be a 5G network defined by third generation partnership project (3GPP). Additionally, according to an embodiment, the first communication processor 212 or the second communication processor 214 may support establishment of a communication channel corresponding to another designated band (e.g., about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (e.g., legacy network), during transmission. During reception, an RF signal may be acquired from the first network 292 (e.g., legacy network) through an antenna (e.g., the first antenna module 242), and may be preprocessed through an RFFE (e.g., first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (e.g., about 6 GHz or lower) (hereinafter, referred to as a 5G Sub6 RF signal) that is used for the second network 294 (e.g., 5G network). During reception, a 5G Sub6 RF signal may be acquired from the second network 294 (e.g., 5G network) through an antenna (e.g., the second antenna module 244), and may be preprocessed through an RFFE (e.g., the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (e.g., about 6 GHz to about 60 GHz) (hereinafter, referred to as a 5G Above6 signal) that is to be used for the second network 294 (e.g., 5G network). During reception, a 5G Above6 RF signal may be acquired from the second network 294 (e.g., 5G network) through an antenna (e.g., the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (e.g., about 9 GHz to about 11 GHz) (hereinafter, referred to as an IF signal) and then deliver the IF signal to the third RFIC 226. The third RFIC 226 may convert the IF signal into a 5G Above6 RF signal.

During reception, a 5G Above6 RF signal may be received from the second network 294 (e.g., 5G network) through an antenna (e.g., antenna 248) and converted into an IF signal by the third RFIC 226. The fourth RFIC 228 may convert the IF signal into a baseband signal such that the same can be processed by the second communication processor 214.

According to an embodiment, the first RIFC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (e.g., main PCB). In this case, the third RFIC 226 may be formed on a partial area (e.g., lower surface) of a second substrate (e.g., sub PCB) that is separate from the first substrate, and the antenna 248 may be arranged in another partial area (e.g., upper surface), thereby forming a third antenna module 246. The third RFIC 226 and the antenna 248 may be arranged on the same substrate such that the length of the transmission line between the same can be reduced. This may reduce loss (e.g., attenuation) of a signal in a high-frequency band (e.g., about 6 GHz to about 60 GHz) used for 5G network communication, for example, due to the transmission line. Accordingly, the electronic device 101 may improve the quality or speed of communication with the second network 294 (e.g., 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (e.g., base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (e.g., 5G network) may be operated independently of the first network 292 (e.g., legacy network) (e.g., standalone (SA)), or operated while being connected thereto (e.g., non-standalone (NSA)). For example, the 5G network may include only an access network (e.g., 5G radio access network (RAN) or next-generation network (NG RAN)) and include no core network (e.g., next-generation core (NGC)). In this case, the electronic device 101 may access the access network of the 5G network and then access an external network (e.g., Internet) under the control of the core network (e.g., evolved packed core (EPC)) of the legacy network. Protocol information (e.g., LTE protocol network) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

An electronic device (e.g., 301 in FIG. 3) according to various embodiments of the disclosure includes a Wi-Fi module (e.g., 250 in FIG. 2) performing communication in a first frequency band (e.g., 6 GHz or less), a communication module performing wireless communication with a given network in a second frequency band (e.g., 6 GHz or more), a first processor (e.g., 214 in FIG. 2) operatively connected to the communication module, a second processor (e.g., 120 in FIG. 2) operatively connected to the Wi-Fi module 250 and the first processor 214, and a memory operatively connected to the second processor. The memory may store instructions, which, when the memory is executed, enable the second processor 120 to receive a message, notifying the state in which the electronic device 301 performs wireless communication with the given network, from the first processor 214 and to lower transmit (Tx) power of the Wi-Fi module 250 in response to the message. When the state of the first processor 214 becomes a 5G(NR) radio resource control (RRC) connected state, the first processor 214 transmits the message to the second processor 120. The memory may store instructions, which, when the memory is executed, enable the second processor 120 to detect whether the Wi-Fi module 250 has been activated in response to the reception of the message from the first processor 214 and to lower Tx power of the Wi-Fi module 250 when the Wi-Fi module 250 is activated. The memory may store instructions, which, when the memory is executed, enable the second processor 120 to detect whether the 5G(NR) RRC connected state switches to another state while the Tx power of the Wi-Fi module 250 is lowered and to release the operation of lowering the Tx power of the Wi-Fi module 250 when the 5G(NR) RRC connected state switches to another state. The memory may store instructions, which, when the memory is executed, enable the second processor 120 to detect whether the 5G(NR) RRC connected state switches to an RRC release state in response to the reception of a first control command from the first external device, as an operation of detecting whether the 5G(NR) RRC connected state switches to another state. The memory may store instructions, which, when the memory is executed, enable the second processor 120 to detect whether the 5G(NR) RRC connected state switches to an RRC inactive state or an RRC idle state in response to the reception of a second control command from the second external device, as an operation of detecting whether the 5G(NR) RRC connected state switches to another state. The memory may store instructions, which, when the memory is executed, enable the second processor 120 to detect the start of uplink transmission over the given network and to lower Tx power of the Wi-Fi module 250 in response to the start of the uplink transmission. The memory may store instructions, which, when the memory is executed, enable the second processor 120 to lower the Tx power of the Wi-Fi module 250 for a given time from the start of the uplink transmission timing, as an operation of lowering Tx power of the Wi-Fi module 250, in response to the start of the uplink transmission. The memory may store instructions, which, when the memory is executed, enable the second processor 120 to detect whether a call function is executed when the Wi-Fi module 250 is activated and to lower Tx power of the Wi-Fi module 250 when the call function is executed. The memory may store instructions, which, when the memory is executed, enable the second processor 120 to detect whether an external object approaches the electronic device 301 within a given distance through a proximity sensor when the Wi-Fi module 250 is activated and to lower Tx power of the Wi-Fi module 250 when the approach of the external object to the electronic device 301 within the given distance is detected through the proximity sensor. The memory may store instructions, which, when the memory is executed, enable the second processor 120 to lower Tx power of at least one frequency supported by the Wi-Fi module 250, as an operation of lowering Tx power of the Wi-Fi module 250. The memory store instructions, which, when the memory is executed, enable the second processor 120 to lower Tx power of at least one antenna connected to the Wi-Fi module 250, as an operation of lowering Tx power of the Wi-Fi module 250.

A method for an electronic device (e.g., 301 in FIG. 3) to control Tx power according to various embodiments of the disclosure may include an operation of identifying whether the state of the electronic device is the state in which the electronic device wirelessly communicates with a given network (e.g., 5G network) and an operation of lowering Tx power of a Wi-Fi module (e.g., 250 in FIG. 2) if the state of the electronic device is the state in which the electronic device performs wireless communication with the given network. The operation of identifying whether the state of the electronic device is the state in which the electronic device wirelessly communicates with a given network may include an operation for the first processor (e.g., 214 in FIG. 2) to identify that the state of the electronic device is a 5G(NR) RRC connected state based on a message received from the second processor (e.g., 120 in FIG. 2), and may further include an operation of detecting whether the 5G(NR) RRC connected state switches to another state while lowering the Tx power of the Wi-Fi module (e.g., 250 in FIG. 2) and an operation of releasing the operation of lowering the Tx power of the Wi-Fi module 250 when the 5G(NR) RRC connected state switches to another state. The operation of detecting whether the 5G(NR) RRC connected state switches to another state may include an operation of detecting whether the 5G(NR) RRC connected state switches to an RRC release state in response to the reception of a first control command from a first external device or an operation of detecting whether the 5G(NR) RRC connected state switches to an RRC inactive state or an RRC idle state in response to the reception of a second control command from a second external device. The operation of lowering the Tx power of the Wi-Fi module 250 may include an operation of detecting the start of uplink transmission over the given network and an operation of lowering the Tx power of the Wi-Fi module 250 in response to the start of the uplink transmission. The operation of lowering the Tx power of the Wi-Fi module 250 may include an operation of detecting whether a call function is executed and an operation of lowering the Tx power of the Wi-Fi module 250 when the call function is executed. The operation of lowering the Tx power of the Wi-Fi module 250 may include an operation of detecting whether an external object approaches the electronic device 301 within a given distance through a proximity sensor and an operation of lowering the Tx power of the Wi-Fi module 250 when the approach of the external object to the electronic device 301 within the given distance is detected through the proximity sensor. The operation of lowering the Tx power of the Wi-Fi module 250 may include an operation of lowering Tx power of at least one frequency supported by the Wi-Fi module 250 or an operation of lowering Tx power of at least one antenna connected to the Wi-Fi module 250.

An electronic device (e.g., 301 in FIG. 3) according to various embodiments of the disclosure includes a Wi-Fi module (e.g., 250 in FIG. 2) performing communication in a first frequency band, a communication module performing wireless communication with a given network in a second frequency band, a first processor (e.g., 214 in FIG. 2) operatively connected to the communication module, a second processor (e.g., 120 in FIG. 2) operatively connected to a Wi-Fi module (e.g., 250 in FIG. 2) and the first processor 214, and a memory operatively connected to the second processor 120. The memory may store instructions, which, when the memory is executed, enable the second processor 120 to receive a message, notifying that the state of the electronic device 301 is the state in which the electronic device 301 performs wireless communication with the given network, from the first processor 214 and to lower Tx power of the communication module in response to the message.

Figure 3:
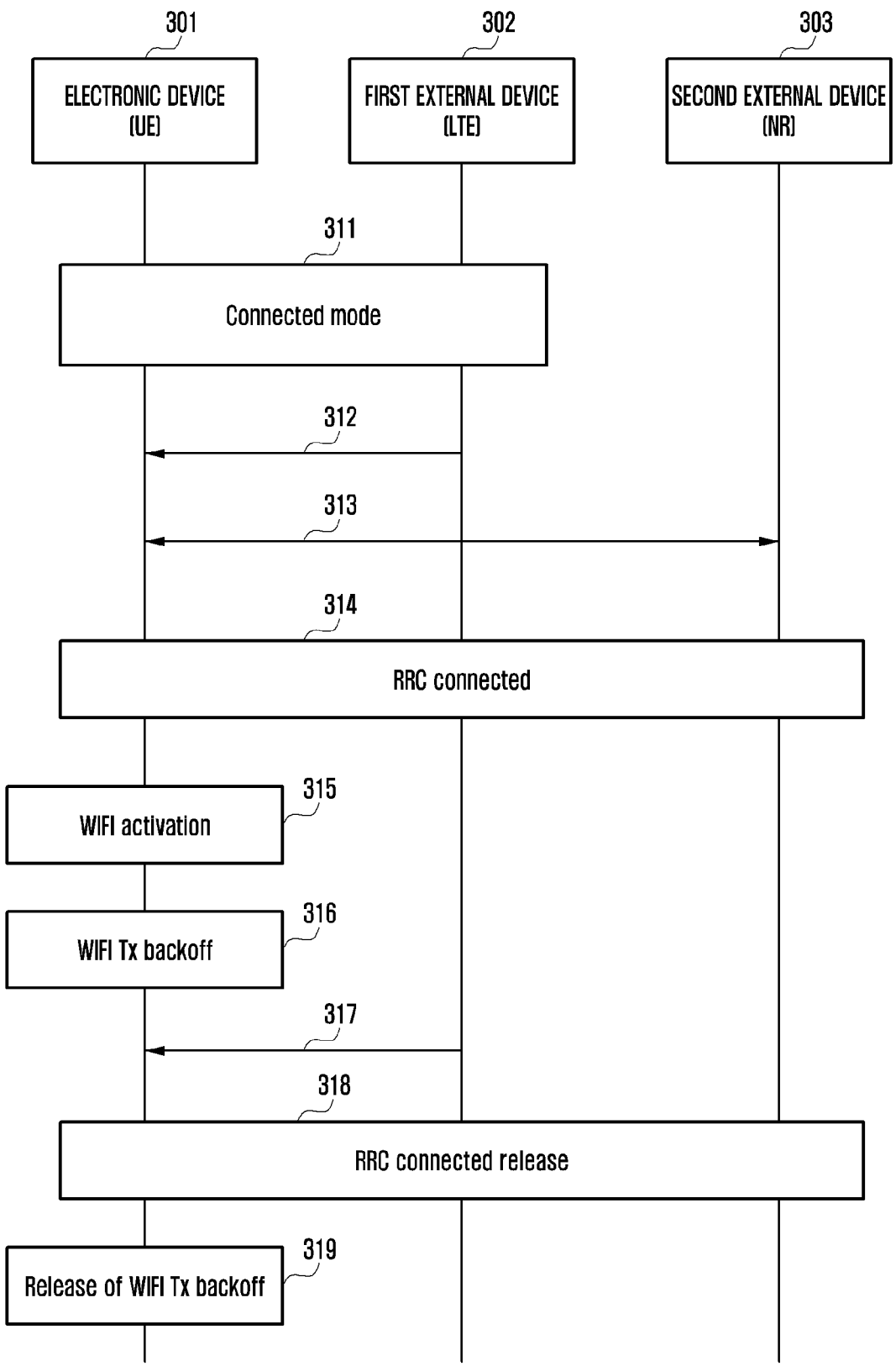
FIG. 3 illustrates a flowchart of an operation of an electronic device according to a first embodiment of the disclosure in a 5G network environment.

FIG. 3 illustrates a flowchart of an operation of an electronic device 301 according to a first embodiment of the disclosure in a 5G network environment.

Referring to FIG. 3, the electronic device 301 (e.g., the electronic device 101 in FIG. 1) according to an embodiment may access a second external device 303 (e.g., second base station), supporting a second network (e.g., 5G (new radio (NR)) network), using a first external device 302 (e.g., first base station) supporting a first network (e.g., long term evolution (hereinafter referred to as an "LTE") network)). For example, the electronic device 301 according to an embodiment may operate in a non-stand alone (NSA) mode. The first external device 302 may perform communication in a 6 GHz band or less, and the second external device may perform communication in a 6 GHz band or more. The electronic device 301 may perform Wi-Fi communication, and may perform communications with LTE and NR at the same time while performing Wi-Fi communication. For example, the electronic device may perform transmission operations with LTE and NR at the same time. The Wi-Fi communication may be based on the 802.11 standard and may perform communication in a 6 GHz band or less.

At operation 311, the electronic device 301 according to an embodiment may become a connected mode state in which the electronic device 301 has been connected with the first external device 302 based on the results of configuration information of a given protocol for LTE communication, exchanged with the first external device 302.

At operation 312, the electronic device 301 according to an embodiment may receive, from the first external device 302, a reconfiguration command to access a second network (e.g., 5G network).

At operation 313, the electronic device 301 according to an embodiment may perform a random access (RA) procedure of a given protocol for accessing the second external device 303 in response to the reconfiguration command received from the first external device 302.

At operation 314, the state of the electronic device 301 according to an embodiment may become a 5G(NR) RRC connected state in which the electronic device 301 has been connected to the second external device 303 based on the results of the execution of the RA procedure of the given protocol.

At operation 315, when the state of the electronic device 301 becomes the 5G(NR) RRC connected state, the electronic device 301 according to an embodiment may detect whether a Wi-Fi module (e.g., the Wi-Fi module 250 in FIG. 2) has been activated. For example, when the RA procedure is completed and thus the state of the electronic device 301 becomes the 5G(NR) RRC connected state, a communication processor (e.g., the second communication processor 214 in FIG. 2) of the electronic device 301 may generate a message indicating that wireless communication over a 5G network has started, and may transmit the message to an application processor (e.g., the processor 120 in FIG. 2). For example, the message may have a configuration (or a format, form or protocol) which may be interpreted by the communication processor 214.

According to one embodiment, the application processor 120 of the electronic device 301 may detect whether the Wi-Fi module 250 has been activated in response to information transmitted by the communication processor 214. According to one embodiment, the application processor 120 of the electronic device 301 may activate the Wi-Fi module 250 based on the following scenarios. For example, the application processor 120 of the electronic device 301 may activate the Wi-Fi module 250 based on a user input. Alternatively, the application processor 120 of the electronic device 301 may obtain place information (e.g., GPS information or the IP address of a fixed wireless router) of the electronic device 301 and may activate the Wi-Fi module 250 if the place information corresponds to a given place. According to one embodiment, if the electronic device 301 is driven in the Android™ operating system (OS), the Wi-Fi module 250 may transmit notification to the application processor 120 when the state of the electronic device 301 is changed through WIFI_STATE_CHANGED_ACTION of WifiManger. The notification may be monitored through BroadcastReceiver registration. The application processor 120 may identify whether the Wi-Fi module 250 has been activated by checking an EXTRA_WIFI_STATE value, that is, state change notification.

At operation 316, when the activation of the Wi-Fi module 250 is detected, the electronic device 301 according to an embodiment may control to lower Tx power of the Wi-Fi module 250. For example, the application processor 120 of the electronic device 301 may receive, from the communication processor 214, information indicating that wireless communication over a 5G network has started, and may transmit a control command to a driver that drives the Wi-Fi module 250 so that the Tx power of the Wi-Fi module 250 is lowered in response to the reception of the information. For example, if the electronic device 301 operates in the Android™ OS, the application processor 120 may transmit a control command to the Wi-Fi module 250 using a function, such as Intent-BroadcastReceiver or Binder, or using a hardware abstraction layer or rather hardware annotation library (HAL) interface definition language (IDL) or an Android interface definition language (AIDL). According to one embodiment, lowering the Tx power of the Wi-Fi module 250 may mean lowering maximum Tx power of the Wi-Fi module 250.

According to one embodiment, the electronic device 301 may additionally lower Tx power of LTE communication while lowering Tx power of the Wi-Fi module 250. For example, when the proximity of the human body is detected by a grip sensor, the electronic device 301 may lower Tx power of LTE communication.

According to various embodiments, the electronic device 301 may detect a given event when the Wi-Fi module 250 is activated and may control to lower Tx power of the Wi-Fi module 250 when the given event is detected. For example, the given event may be a call function. When the Wi-Fi module 250 is activated, the electronic device 301 may lower Tx power of the Wi-Fi module 250 in response to the execution of a call function. For another example, the given event may mean that an external object approaches the electronic device 301 through a proximity sensor. The electronic device 301 may lower Tx power of the Wi-Fi module 250 in response to the approach of the external object within a given distance, detected through the proximity sensor.

According to one embodiment, the electronic device 301 may adjust Tx power of at least one frequency supporting Wi-Fi communication or may adjust Tx power of at least one antenna connected to the Wi-Fi module 250 through Wi-Fi communication, as an operation of lowering Tx power of the Wi-Fi module 250.

At operation 317 and operation 318, the electronic device 301 according to an embodiment may detect whether the 5G(NR) RRC connected state switches to another state while lowering the Tx power of the Wi-Fi module 250. For example, the electronic device 301 may receive a first control command (e.g., RRC release command) from the first external device 302 while lowering Tx power of the Wi-Fi module 250, and may change its state to an RRC release state in response to the first control command. For another example, when an NR release reconfiguration command is received from the first external device 302, the communication processor 214 of the electronic device 301 may identify that a 5G(NR) RRC connected state switches to another state. Alternatively, when an SCG failure (e.g., an RLF or RLC-maxRetransmission) occurs, the electronic device 301 may transmit an SCGfailure message to the first external device 302. Thereafter, when a reconfiguration command for releasing a 5G network is received from the first external device 302, the communication processor 214 of the electronic device 301 may identify that a 5G(NR) RRC connected state switches to another state.

At operation 319, the electronic device 301 according to an embodiment may release an operation of lowering the Tx power of the Wi-Fi module 250 in response to the change from the 5G(NR) RRC connected state to another state (e.g., RRC release state). For example, the application processor 120 of the electronic device 301 may receive, from the communication processor 214, information indicating that a 5G(NR) RRC connected state has switched to another state, and may transmit a control command to a driver that drives the Wi-Fi module 250 so that an operation of lowering Tx power of the Wi-Fi module 250 is released in response to the reception of the information.

Figure 4:
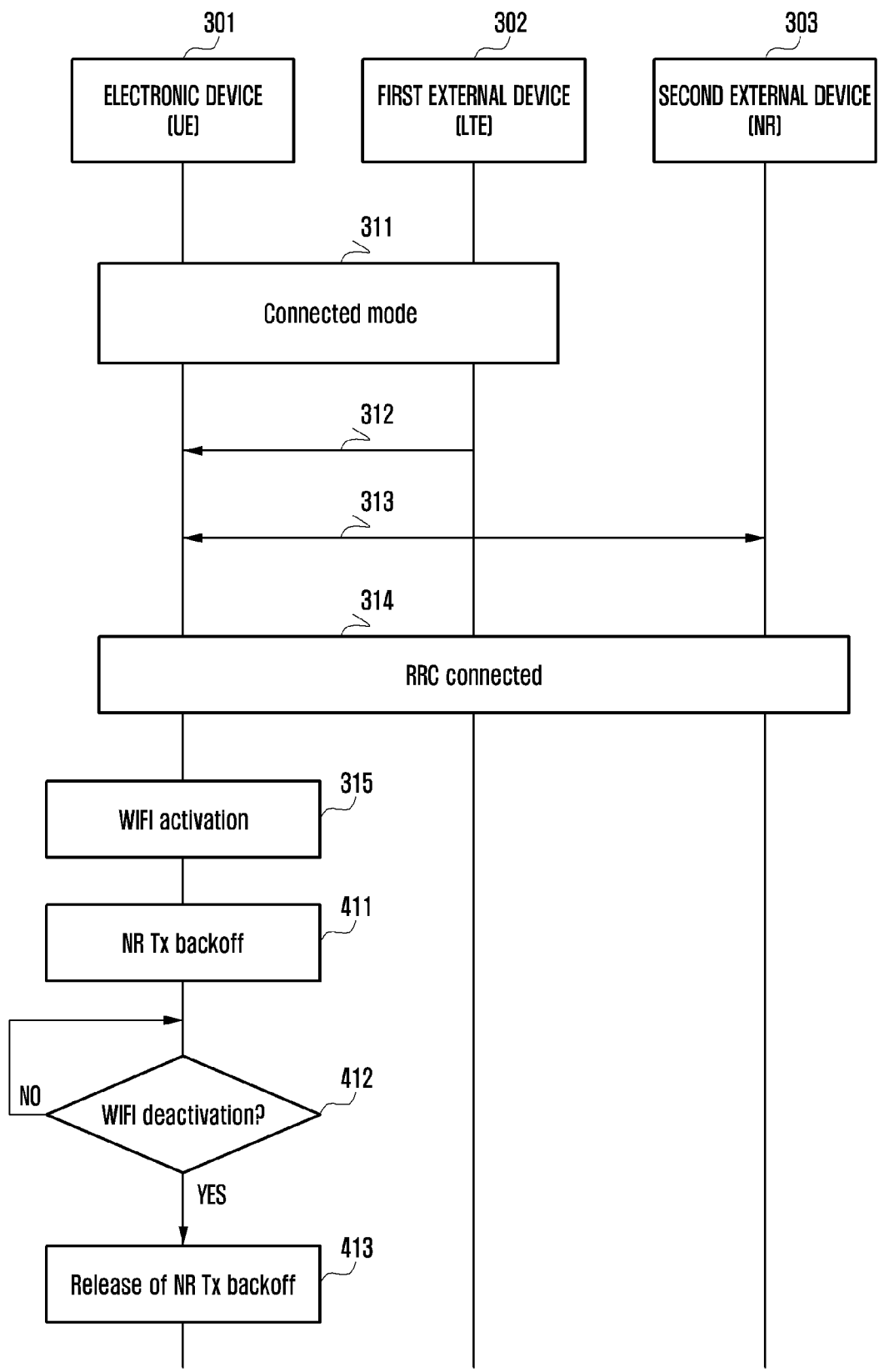
FIG. 4 illustrates a flowchart of an operation of the electronic device according to a second embodiment of the disclosure in a 5G network environment.

FIG. 4 illustrates a flowchart of an operation of the electronic device 301 according to a second embodiment of the disclosure in a 5G network environment.

Referring to FIG. 4, when the Wi-Fi module 250 is activated in a 5G(NR) RRC connected state, the electronic device 301 according to another embodiment may lower Tx power of an antenna for communicating with a second network (e.g., 5G network). For example, operation 311 to operation 315 illustrated in FIG. 4 may be the same or similar to operation 311 to operation 315 illustrated in FIG. 3. Accordingly, in the following description, only operations after operation 315 are described.

At operation 411, when the activation of the Wi-Fi module 250 is detected, the electronic device 301 according to an embodiment may lower Tx power of an antenna for communicating with a second network (e.g., 5G network). For example, when the activation of the Wi-Fi module 250 is detected, the application processor 120 of the electronic device 301 may transmit, to the communication processor 214, information indicating that the Wi-Fi module 250 has been activated. When the information indicating that the Wi-Fi module 250 has been activated is received from the application processor 120, the communication processor 214 of the electronic device 301 may lower Tx power of an antenna for communicating with a second network (e.g., 5G network). The embodiment of FIG. 4 enables efficient data communication and can also lower a numerical value of MPE compared to the embodiment illustrated in FIG. 3 because Wi-Fi communication is used for most of data communication when the electronic device 301 accesses a wireless router through the Wi-Fi module 250.

According to one embodiment, the electronic device 301 may additionally lower Tx power of LTE communication. For example, when the proximity of the human body is detected by a grip sensor, the electronic device 301 may lower Tx power of LTE communication.

At operation 412, the electronic device 301 according to an embodiment may detect whether the Wi-Fi module 250 is deactivated while lowering Tx power of an antenna for communicating with a second network (e.g., 5G network). For example, the application processor 120 of the electronic device 301 may detect whether a Wi-Fi function is deactivated based on a user input.

At operation 413, when the Wi-Fi module 250 is deactivated (e.g., a result of operation 412 is Yes) while Tx power of an antenna for communicating with a second network (e.g., 5G network) is lowered, the electronic device 301 according to an embodiment may release an operation of lowering Tx power of an antenna for communicating with a second network (e.g., 5G network). For example, when the deactivation of the Wi-Fi module 250 is detected, the application processor 120 of the electronic device 301 may transmit, to the communication processor 214, information indicating that the Wi-Fi module 250 has been deactivated. When the information indicating that the Wi-Fi module 250 has been deactivated is received, the communication processor 214 of the electronic device 301 may release an operation of lowering Tx power of an antenna for communicating with a second network (e.g., 5G network).

Figure 5:
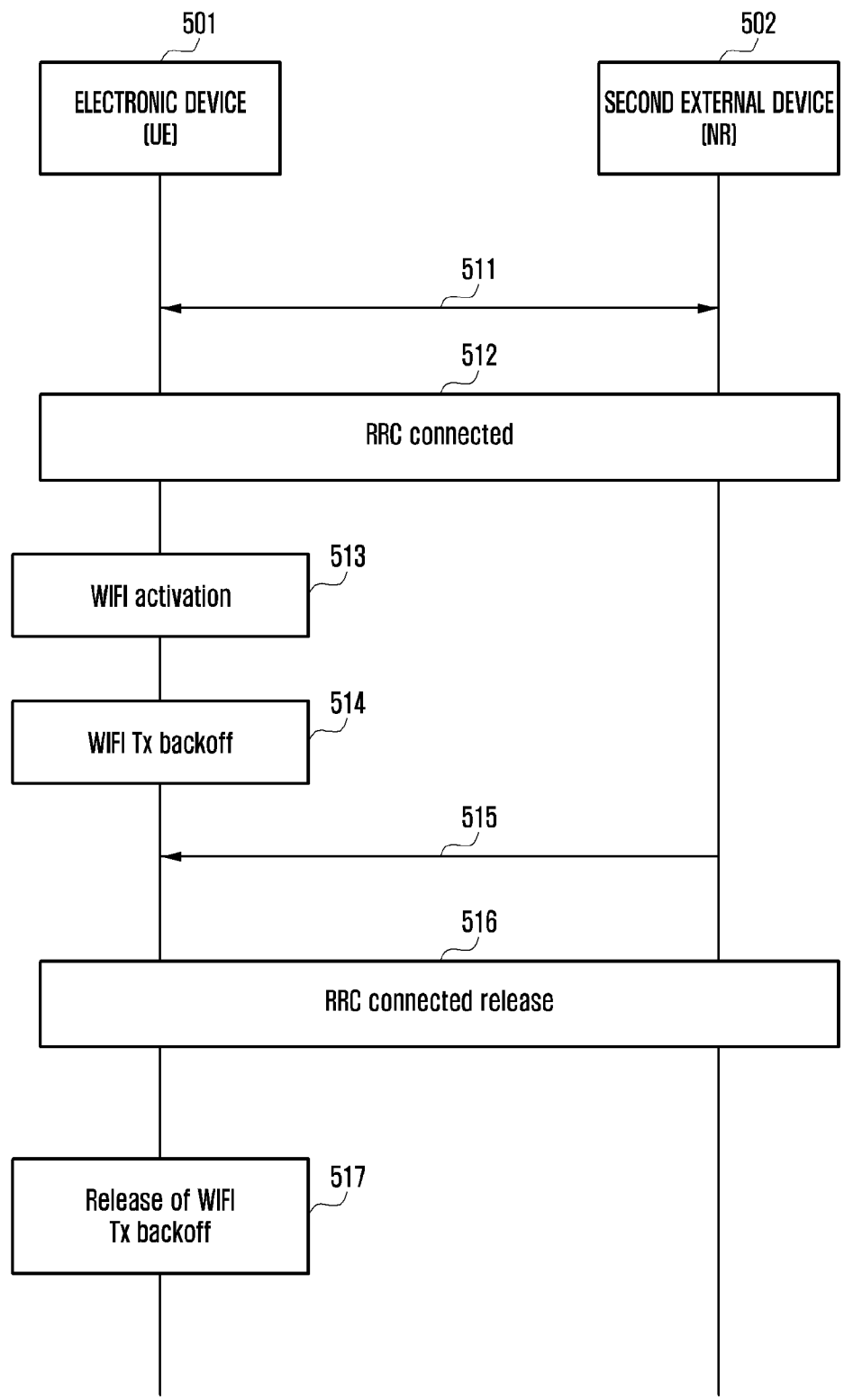
FIG. 5 illustrates a flowchart of an operation of an electronic device according to a third embodiment of the disclosure in a 5G network environment.

FIG. 5 illustrates a flowchart of an operation of an electronic device 501 according to a third embodiment of the disclosure in a 5G network environment.

Referring to FIG. 5, the electronic device 501 (e.g., the electronic device 101 in FIG. 1) according to an embodiment may access a second external device 502 (e.g., second base station), supporting a second network (e.g., 5G network), independently of the first external device 302 (e.g., the first external device 302 of FIG. 3) supporting a first network (e.g., LTE network). For example, the electronic device 501 according to an embodiment may operate in a stand-alone (SA) mode.

At operation 511, the electronic device 501 according to an embodiment may exchange configuration information of a given protocol for 5G communication with the second external device 502. For example, the electronic device 501 may perform a random access (RA) procedure of a given protocol for accessing the second external device 502.

At operation 512, the electronic device 501 according to an embodiment may become an RRC connected state in which the electronic device 501 has been connected to the second external device 502 based on the results of the execution of the RA procedure of the given protocol.

At operation 513, when the state of the electronic device 501 becomes the 5G(NR) RRC connected state, the electronic device 501 according to an embodiment may detect whether a Wi-Fi module (e.g., the Wi-Fi module 250 in FIG. 2) has been activated. For example, when an RA procedure is completed and thus the state of the electronic device 501 becomes a 5G(NR) RRC connected state, a communication processor (e.g., the second communication processor 214 in FIG. 2) of the electronic device 501 may generate a message indicating that wireless communication over a 5G network has started, and may transmit the message to an application processor (e.g., the processor 120 in FIG. 2). For example, the message may have a configuration (or a format, a form or protocol) which may be interpreted by the communication processor 214.

According to one embodiment, the application processor 120 of the electronic device 501 may detect whether the Wi-Fi module 250 has been activated in response to information received from the communication processor 214. According to one embodiment, the application processor 120 of the electronic device 501 may activate the Wi-Fi module 250 based on the following scenarios. For example, the application processor 120 of the electronic device 501 may activate the Wi-Fi module 250 based on a user input. Alternatively, the application processor 120 of the electronic device 501 may obtain place information (e.g., GPS information or the IP address of a fixed wireless router) of the electronic device 501 and may activate the Wi-Fi module 250 if the place information corresponds to a given place.

At operation 514, when the activation of the Wi-Fi module 250 is detected, the electronic device 501 according to an embodiment may control to lower Tx power of the Wi-Fi module 250. For example, the application processor 120 of the electronic device 501 may receive, from the communication processor 214, information indicating that wireless communication over a 5G network has started, and may transmit a control command to a driver that drives the Wi-Fi module 250 so that Tx power of the Wi-Fi module 250 is lowered in response to the reception of the information. For example, if the electronic device 501 operates in the Android™ OS, the application processor 120 may transmit a control command to the Wi-Fi module 250 using a function, such as Intent-BroadcastReceiver or Binder, or using an Android interface definition language (ALDI).

According to one embodiment, the electronic device 301 may additionally lower Tx power of LTE communication. For example, when the proximity of the human body is detected by a grip sensor, the electronic device 301 may lower Tx power of LTE communication.

At operation 515 and operation 516, the electronic device 501 according to an embodiment may detect whether 5G(NR) RRC connected state switches to another state while lowering the Tx power of the Wi-Fi module 250. For example, the electronic device 501 may receive a second control command (e.g., RRC release command) from the second external device 502 while lowering the Tx power of the Wi-Fi module 250, and may change its state to an RRC idle state or an RRC inactive state in response to the second control command.

At operation 517, the electronic device 501 according to an embodiment may release the operation of lowering the Tx power of the Wi-Fi module 250 in response to the change from the 5G(NR) RRC connected state to another state (e.g., RRC idle state or RRC inactive state). For example, the application processor 120 of the electronic device 501 may receive, from the communication processor 214, information indicating that a 5G(NR) RRC connected state has switched to another state, and may transmit a control command to a driver that drives the Wi-Fi module 250 so that an operation of lowering Tx power of the Wi-Fi module 250 is released in response to the reception of the information.

Figure 6:
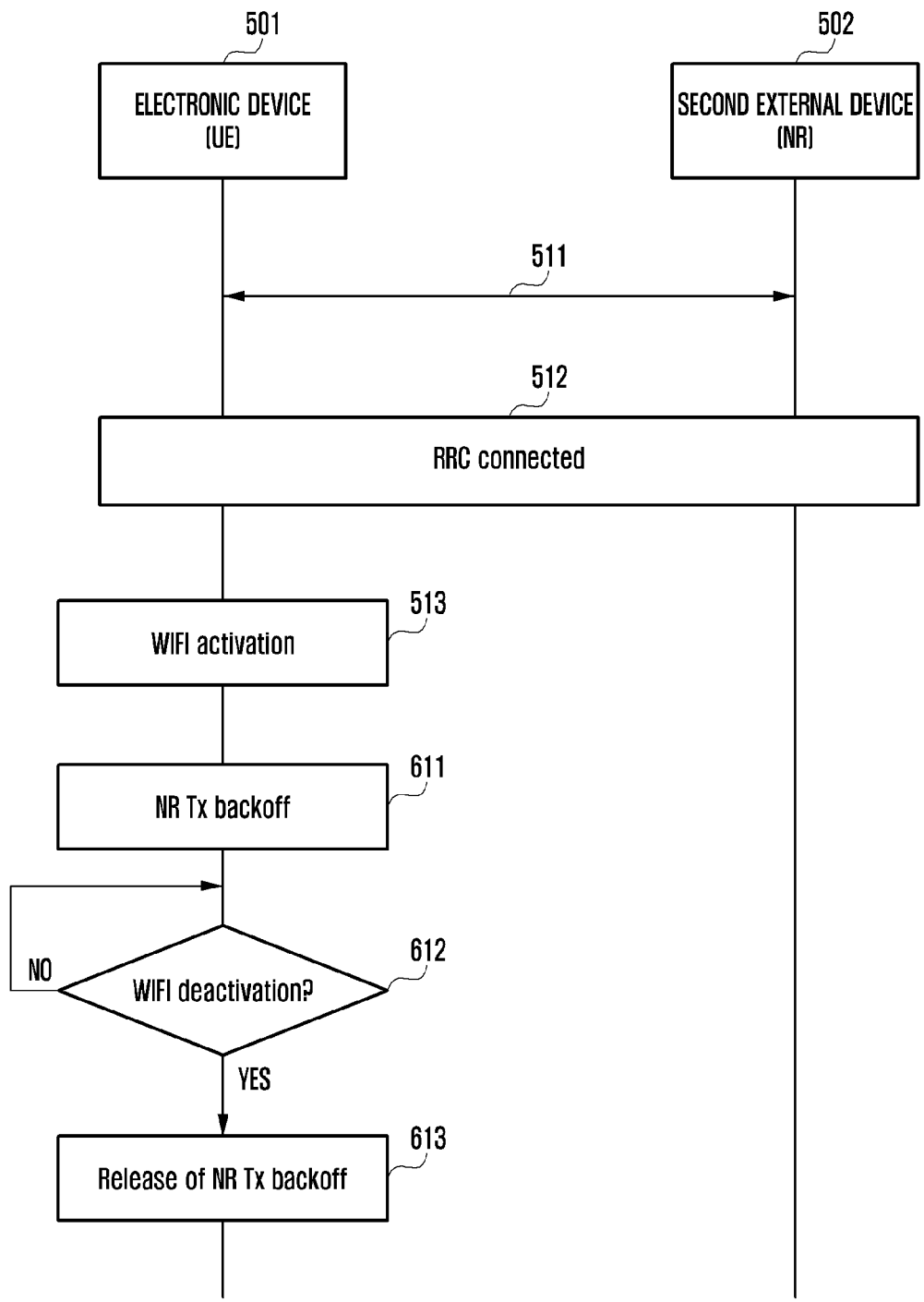
FIG. 6 illustrates a flowchart of an operation of the electronic device according to a fourth embodiment of the disclosure in a 5G network environment.

FIG. 6 illustrates a flowchart of an operation of the electronic device 501 according to a fourth embodiment of the disclosure in a 5G network environment.

Referring to FIG. 6, when the Wi-Fi module 250 is activated in a 5G(NR) RRC connected state, the electronic device 501 according to another embodiment may lower Tx power of an antenna for communicating with a second network (e.g., 5G network). For example, operation 511 to operation 513 illustrated in FIG. 6 may be the same or similar to operation 511 to operation 513 illustrated in FIG. 5. Accordingly, in the following description, only operations after operation 513 are described.

At operation 611, when the activation of the Wi-Fi module 250 is detected, the electronic device 501 according to an embodiment may lower Tx power of an antenna for communicating with a second network (e.g., 5G network). For example, when the activation of the Wi-Fi module 250 is detected, the application processor 120 of the electronic device 501 may transmit, to the communication processor 214, information indicating that the Wi-Fi module 250 has been activated. When the information indicating that the Wi-Fi module 250 has been activated is received from the application processor 120, the communication processor 214 of the electronic device 501 may lower Tx power of an antenna for communicating with a second network (e.g., 5G network).

According to one embodiment, the electronic device 301 may additionally lower Tx power of LTE communication. For example, when the proximity of the human body is detected by a grip sensor, the electronic device 301 may lower Tx power of LTE communication.

At operation 612, the electronic device 501 according to an embodiment may detect whether the Wi-Fi module 250 is deactivated while lowering Tx power of an antenna for communicating with a second network (e.g., 5G network). For example, the application processor 120 of the electronic device 501 may detect whether a Wi-Fi function is deactivated based on a user input.

At operation 613, when the Wi-Fi module 250 is deactivated (e.g., a result of operation 412 is Yes) while the Tx power of an antenna for communicating with a second network (e.g., 5G network) is lowered, the electronic device 501 according to an embodiment may release the operation of lowering the Tx power of an antenna for communicating with a second network (e.g., 5G network). For example, when the deactivation of the Wi-Fi module 250 is detected, the application processor 120 of the electronic device 501 may transmit, to the communication processor 214, information indicating that the Wi-Fi module 250 has been deactivated. When the information indicating that the Wi-Fi module 250 has been deactivated is received, the communication processor 214 of the electronic device 501 may release the operation of lowering the Tx power of an antenna for communicating with a second network (e.g., 5G network).

Figure 7:
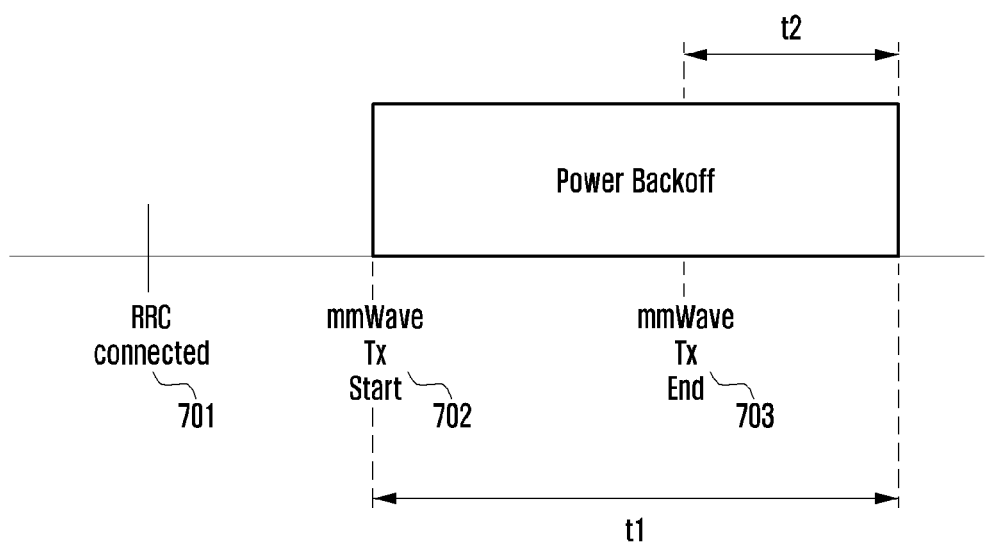
FIG. 7 illustrates an example of a method for the electronic device to perform transmit (Tx) power backoff based on an uplink operation according to an embodiment.

FIG. 7 illustrates an example of a method for the electronic device 501 to perform Tx power backoff based on an uplink operation according to an embodiment.

Referring to FIG. 7, although the state of the electronic device 501 according to an embodiment becomes a 5G(NR) RRC connected state, the electronic device 501 may lower Tx power of the Wi-Fi module 250 in synchronization with a period for uplink transmission over a second network (e.g., 5G network). For example, in FIG. 7, 701 may mean start timing in which the state of the electronic device 501 has switched to a 5G(NR) RRC connected state. In FIG. 7, a period of 702 to 703 may mean a period in which uplink transmission is performed. The electronic device 501 according to an embodiment does not lower Tx power of the Wi-Fi module 250 at the start timing 701 in which the state of the electronic device 501 has switched to the 5G(NR) RRC connected state, and may start an operation of lowering the Tx power of the Wi-Fi module 250 in synchronization with the timing 702 in which uplink transmission is started (i.e., an operation actually affecting a user).

According to one embodiment, the electronic device 501 may lower Tx power of the Wi-Fi module 250 for a given time from the start timing of uplink transmission. For example, an uplink transmission event may occur very frequently. Accordingly, communication performance may be degraded if Tx power of the Wi-Fi module 250 is lowered to correspond to an uplink transmission period because an uplink transmission event irregularly occurs. Accordingly, the electronic device 501 according to an embodiment of the disclosure does not immediately lower Tx power of the Wi-Fi module 250 although uplink transmission is terminated, and may lower Tx power of the Wi-Fi module 250 for a given time from the start timing of the uplink transmission. For example, the example of FIG. 7 illustrates that the period in which Tx power of the Wi-Fi module 250 is lowered may be time t1 from 702 at which uplink transmission is started and an operation of lowering Tx power of the Wi-Fi module 250 is maintained for time t2 although the uplink transmission is terminated at the timing 703.

According to one embodiment, a method for the electronic device 501 to detect an uplink transmission event may be as follows. The communication processor 214 may recognize that an uplink transmission event is started based on scheduling information received from a base station of a 5G network, and may transmit, to the application processor 120, that the uplink transmission event has been started. According to one embodiment, after an operation of lowering Tx power of the Wi-Fi module 250 is terminated, the electronic device 501 may determine whether to perform an operation of additionally lowering the Tx power of the Wi-Fi module 250 based on uplink grant information received from a base station of a 5G network.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to" "connected with" or "connected to" another element (e.g., a second element), it means that the element may be coupled with the other element directly (e.g., in a wired way), wirelessly, or via a third element.

As used herein, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device and the method for the electronic device to control transmit power according to various embodiments of the disclosure can provide an optimal 5G network communication environment while reducing the numerical values of the SAR and MPE.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a Wi-Fi module configured to perform communication in a first frequency band;
   a communication module configured to wirelessly communicate with a given network in a second frequency band;
   a first processor operatively connected to the communication module;
   a second processor operatively connected to the Wi-Fi module and the first processor; and
   a memory operatively connected to the second processor,
   wherein the memory stores instructions that, when executed by the second processor, cause the second processor to:
     receive, from the first processor, a message notifying a state of the electronic device wirelessly communicating with the given network, the state of the electronic device being a radio resource control (RRC) connected state,
     in response to the message from the first processor, detect whether a state of the Wi-Fi module changed to activated based on a state change notification, and
     lower transmit (Tx) power of the Wi-Fi module based on detecting the change of the state of the Wi-Fi module to activated,
   wherein the memory is configured to store instructions that, when executed, cause the second processor to lower the Tx power of the Wi-Fi module to perform transmit power backoff for a given time from a start timing of uplink transmission in response to start of the uplink transmission, as an operation of lowering the Tx power of the Wi-Fi module, and wherein the operation of lowering the Tx power of the Wi-Fi module is maintained for a time although the uplink transmission is terminated at an end timing.

2. The electronic device of claim 1, wherein:
   the first processor is configured to transmit the message to the second processor based on the state of the electronic device being a 5G(NR) radio resource control (RRC) connected state; and
   an application processor is configured to activate the Wi-Fi module based on at least one of: a user input, a determination that a location of the electronic device corresponds to a given location, or an identification of an EXTRA_WIFI_STATE value.

3. The electronic device of claim 1, wherein the memory is configured to store instructions that, when executed, cause the second processor to:
   detect whether a 5G(NR) RRC connected state switches to another state while lowering the Tx power of the Wi-Fi module, and release an operation of lowering the Tx power of the Wi-Fi module based on the 5G(NR) RRC connected state switching to another state.

4. The electronic device of claim 3, wherein the memory is configured to store instructions that, when executed, cause the second processor to detect whether the 5G(NR) RRC connected state switches to an RRC release state in response to a first control command received from a first external device, as an operation of detecting whether the 5G(NR) RRC connected state switches to another state.

5. The electronic device of claim 3, wherein the memory is configured to store instructions that, when executed, cause the second processor to detect whether the 5G(NR) RRC connected state switches to an RRC inactive state or an RRC idle state in response to a second control command received from a second external device, as an operation of detecting whether the 5G(NR) RRC connected state switches to another state.

6. The electronic device of claim 1, wherein the memory is configured to store instructions that, when executed, cause the second processor to:
detect whether a call function is executed based on the Wi-Fi module being activated, and
lower the Tx power of the Wi-Fi module based on the call function being executed.

7. The electronic device of claim 1, wherein the memory is configured to store instructions that, when executed, cause the second processor to:
detect whether an external object approaches the electronic device within a given distance through a proximity sensor based on the Wi-Fi module being activated, and
lower the Tx power of the Wi-Fi module based on the approach of the external object to the electronic device within the given distance being detected through the proximity sensor.

8. The electronic device of claim 1, wherein the memory is configured to store instructions that, when executed, cause the second processor to lower Tx power of at least one frequency supported by the Wi-Fi module, as an operation of lowering the Tx power of the Wi-Fi module.

9. The electronic device of claim 1, wherein the memory is configured to store instructions that, when executed, cause the second processor to lower Tx power of at least one antenna connected to the Wi-Fi module, as an operation of lowering the Tx power of the Wi-Fi module.

10. A method for an electronic device to control transmit power, the method comprising:
identifying whether a state of the electronic device is a state in which the electronic device is a radio resource control (RRC) connected state based on results of execution of a random access (RA) procedure of a given protocol associated with wireless communication with a given network;
in response to identifying 5G(NR) radio resource control (RRC) connected state is the state of the electronic device, detecting whether a state of a Wi-Fi module changed to activated based on a state change notification;

lowering transmit (Tx) power of the Wi-Fi module based on a detection the change of the state of the Wi-Fi module to activated; and
lowering the Tx power of the Wi-Fi module to perform transmit power backoff for a given time (t1) from a start timing of uplink transmission in response to the start of the uplink transmission, as an operation of lowering the Tx power of the Wi-Fi module, wherein an operation of lowering the Tx power of the Wi-Fi module is maintained for a time (t2) although the uplink transmission is terminated at an end timing.

11. The method of claim 10, wherein identifying whether a state of the electronic device is a state in which the electronic device wirelessly communicates with a given network comprises identifying, by a first processor, the state of the electronic device to be a 5G(NR) radio resource control (RRC) connected state based on a message received from a second processor.

12. The method of claim 11, further comprising:
detecting whether the 5G(NR) RRC connected state switches to another state while lowering the Tx power of the Wi-Fi module, and
releasing an operation of lowering the Tx power of the Wi-Fi module based on the 5G(NR) RRC connected state switching to another state.

13. The method of claim 12, wherein detecting whether the 5G(NR) RRC connected state switches to another state comprises:
detecting whether the 5G(NR) RRC connected state switches to an RRC release state in response to a first control command received from a first external device, or
detecting whether the 5G(NR) RRC connected state switches to an RRC inactive state or an RRC idle state in response to a second control command received from a second external device.

14. The method of claim 10, wherein lowering Tx power of the Wi-Fi module comprises:
detecting whether a call function is executed, and
lowering the Tx power of the Wi-Fi module based on the call function being executed.

15. The method of claim 10, wherein lowering Tx power of a Wi-Fi module comprises:
detecting whether an external object approaches the electronic device within a given distance through a proximity sensor, and
lowering the Tx power of the Wi-Fi module based on the approach of the external object to the electronic device within the given distance being detected through the proximity sensor.

16. The method of claim 10, wherein lowering Tx power of a Wi-Fi module comprises:
lowering Tx power of at least one frequency supported by the Wi-Fi module or
lowering Tx power of at least one antenna connected to the Wi-Fi module.

* * * * *

UNITED STATES PATENT AND TRADEMARK OFFICE
CERTIFICATE OF CORRECTION

PATENT NO. : 11,304,147 B2  
APPLICATION NO. : 16/785886  
DATED : April 12, 2022  
INVENTOR(S) : Yang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 33 days.

Signed and Sealed this  
Twenty-ninth Day of November, 2022

Katherine Kelly Vidal  
*Director of the United States Patent and Trademark Office*